Patented Oct. 18, 1932

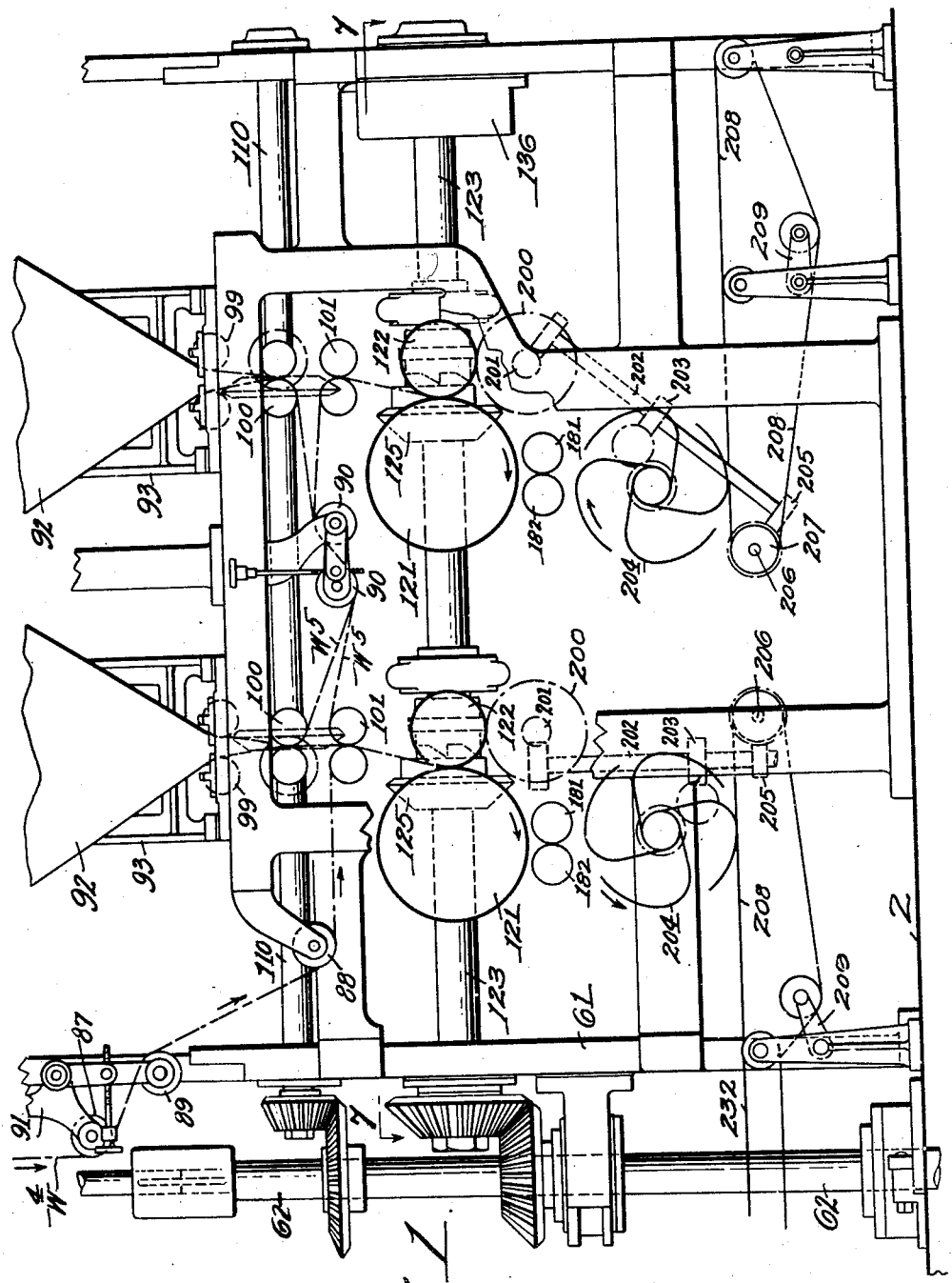

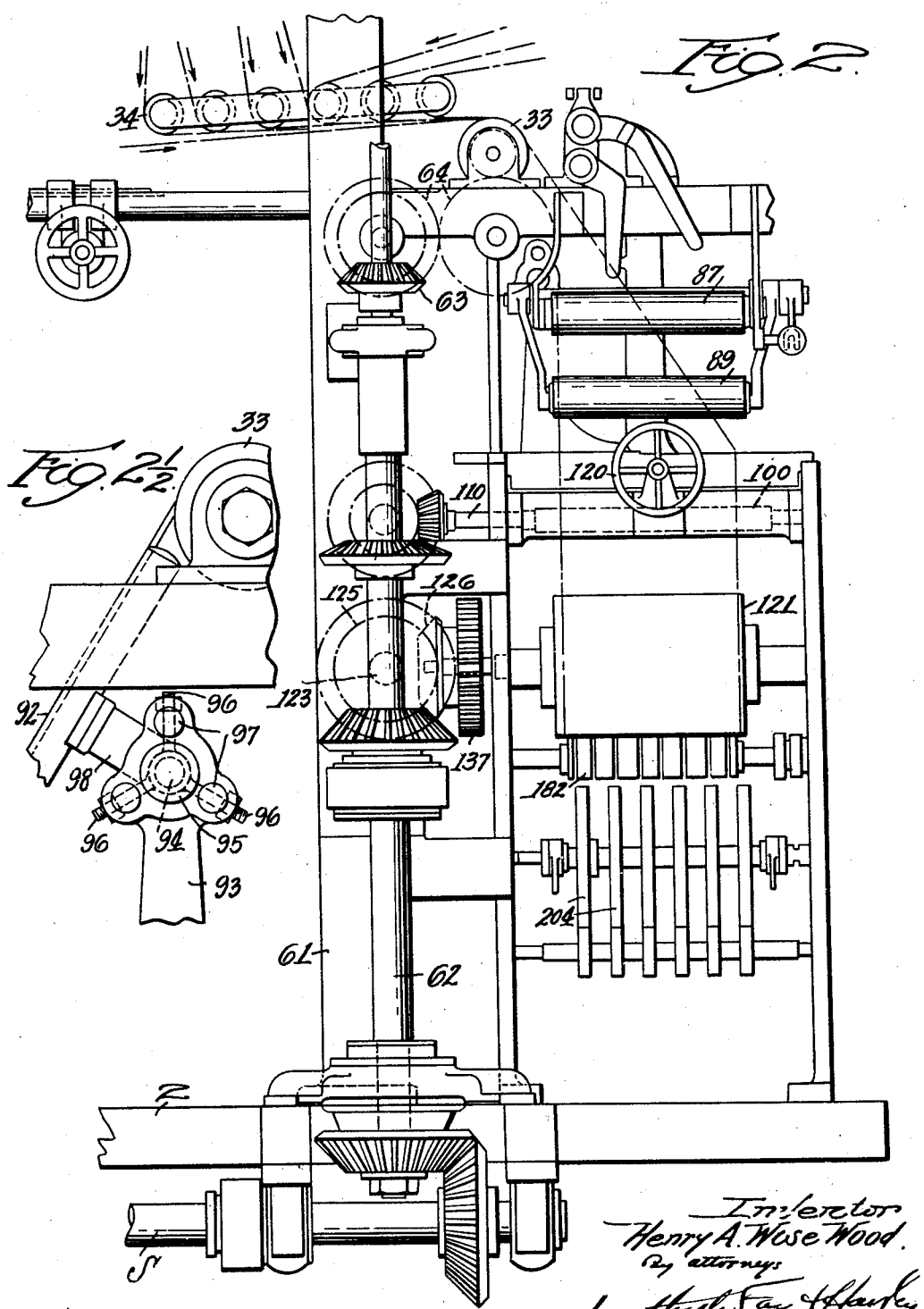

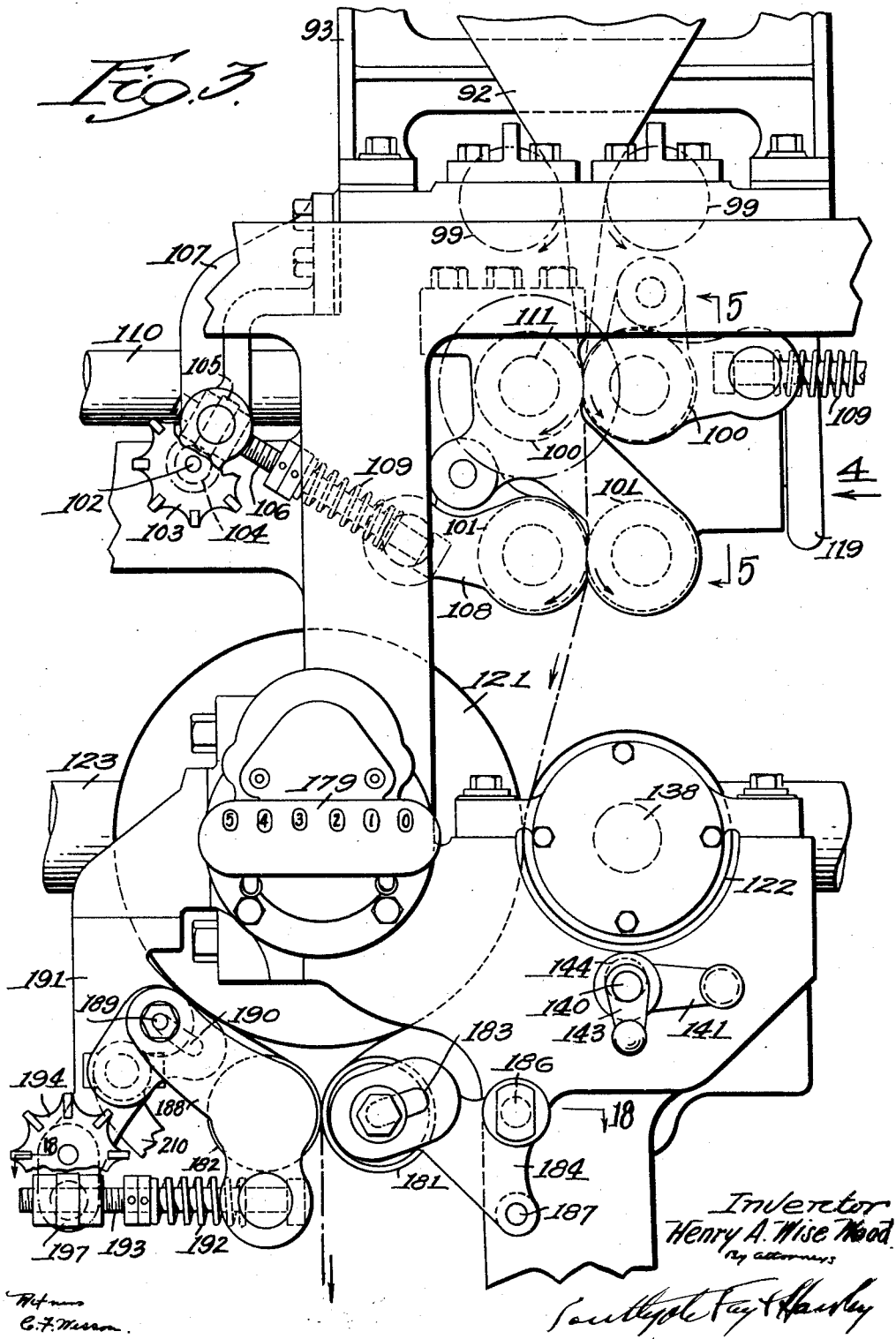

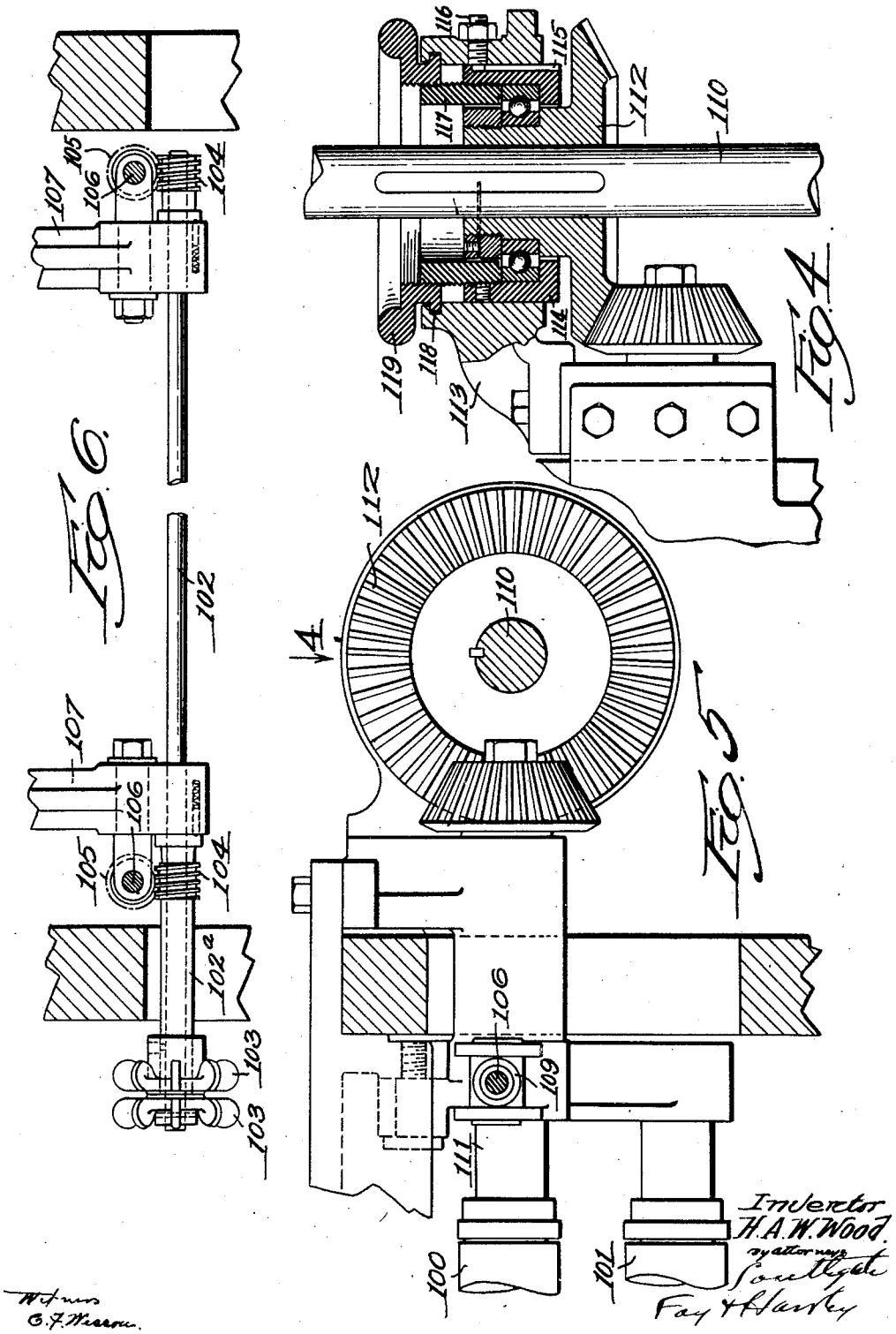

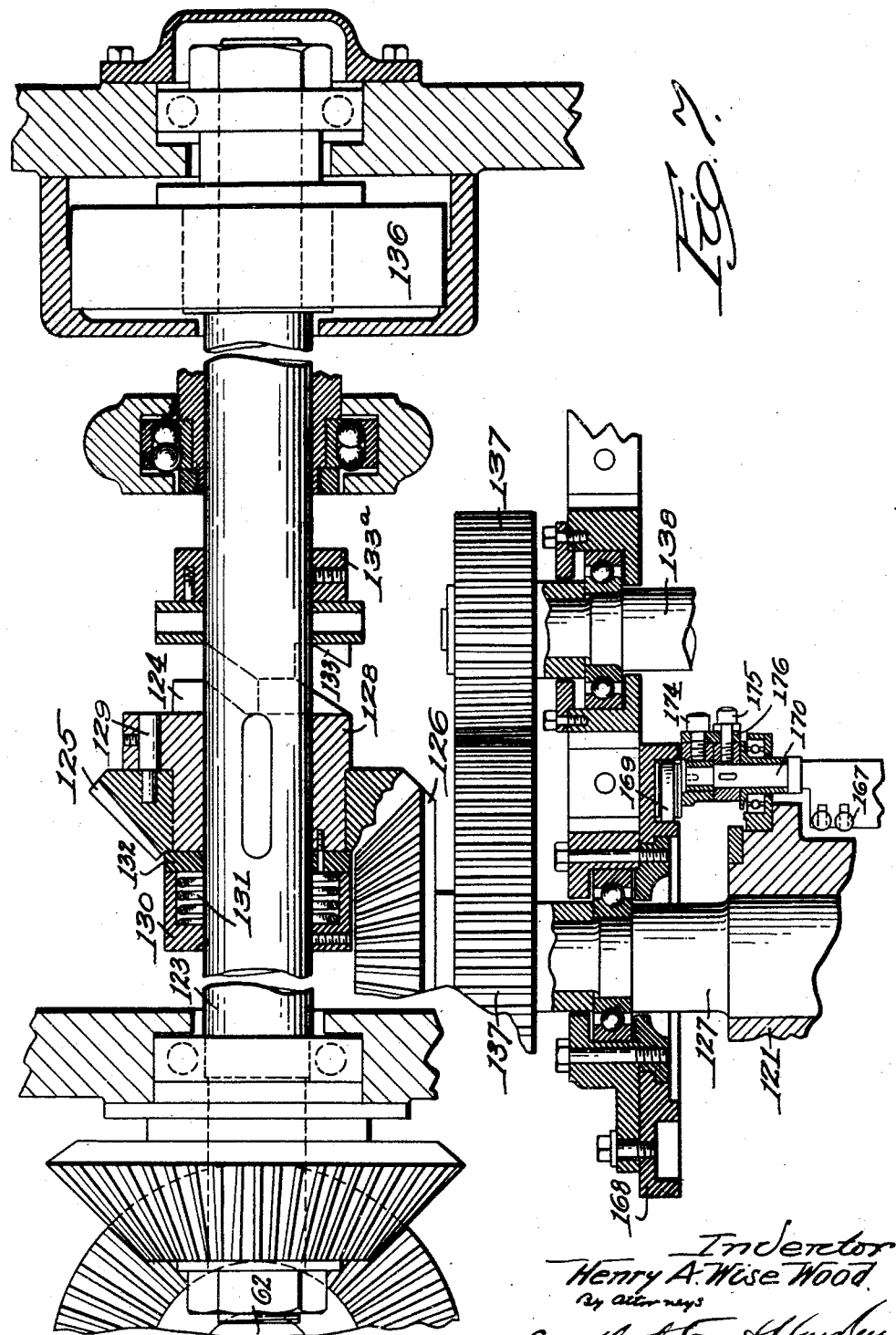

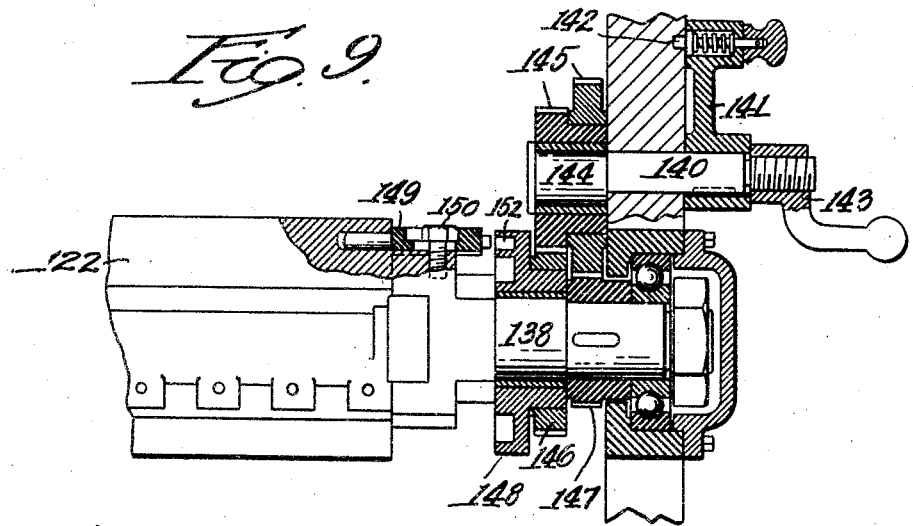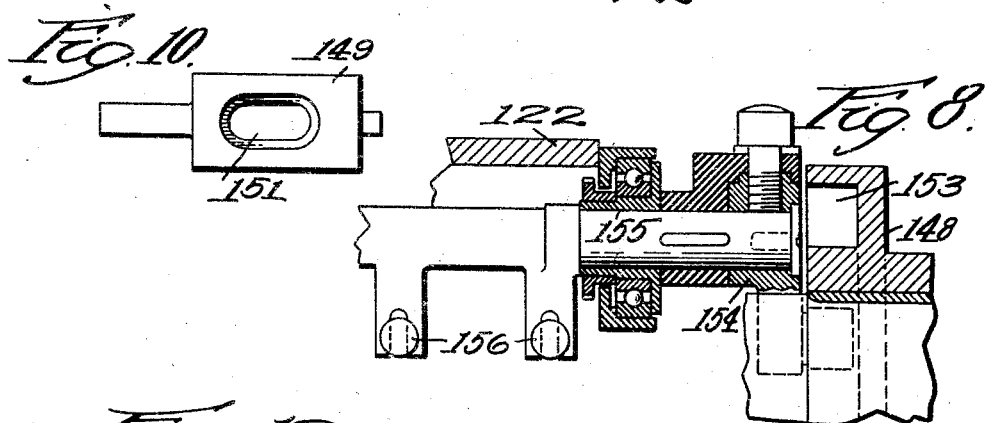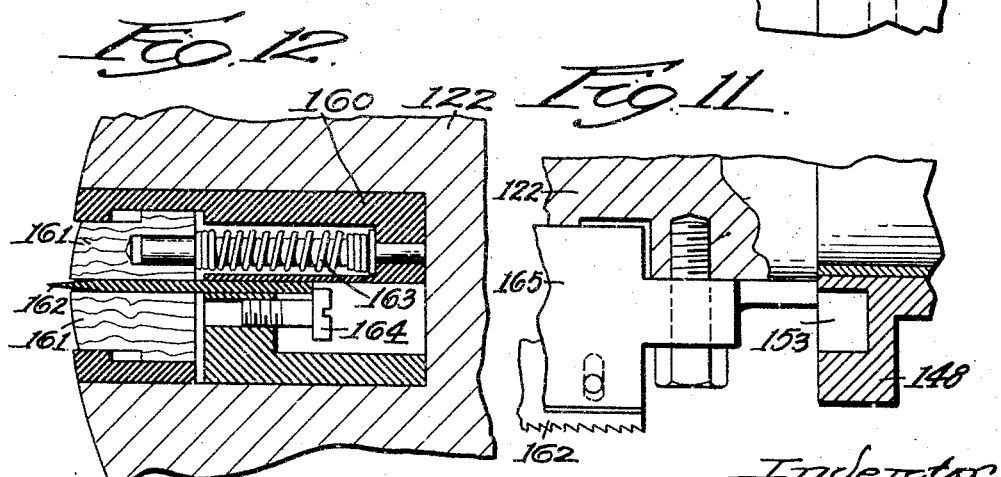

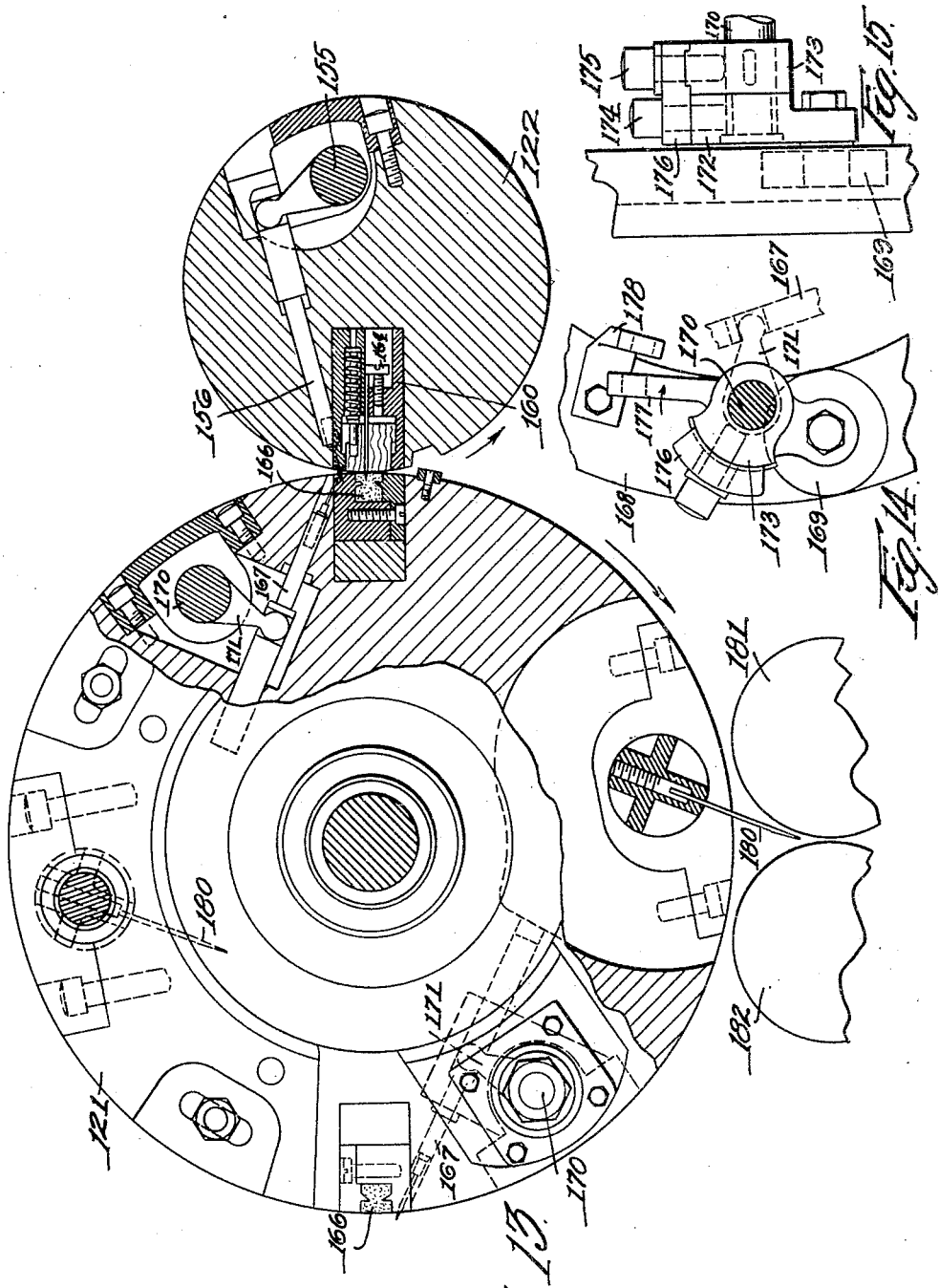

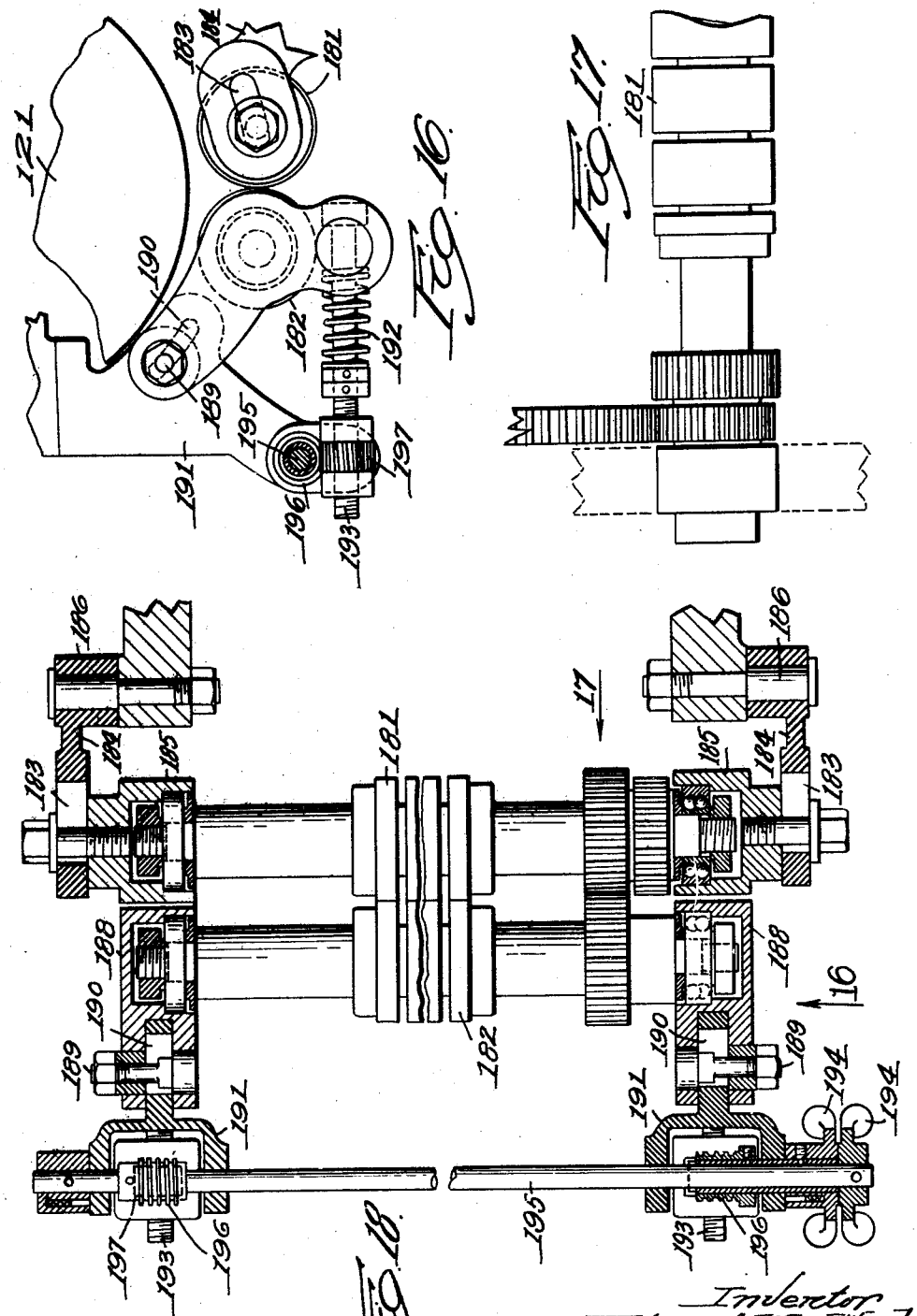

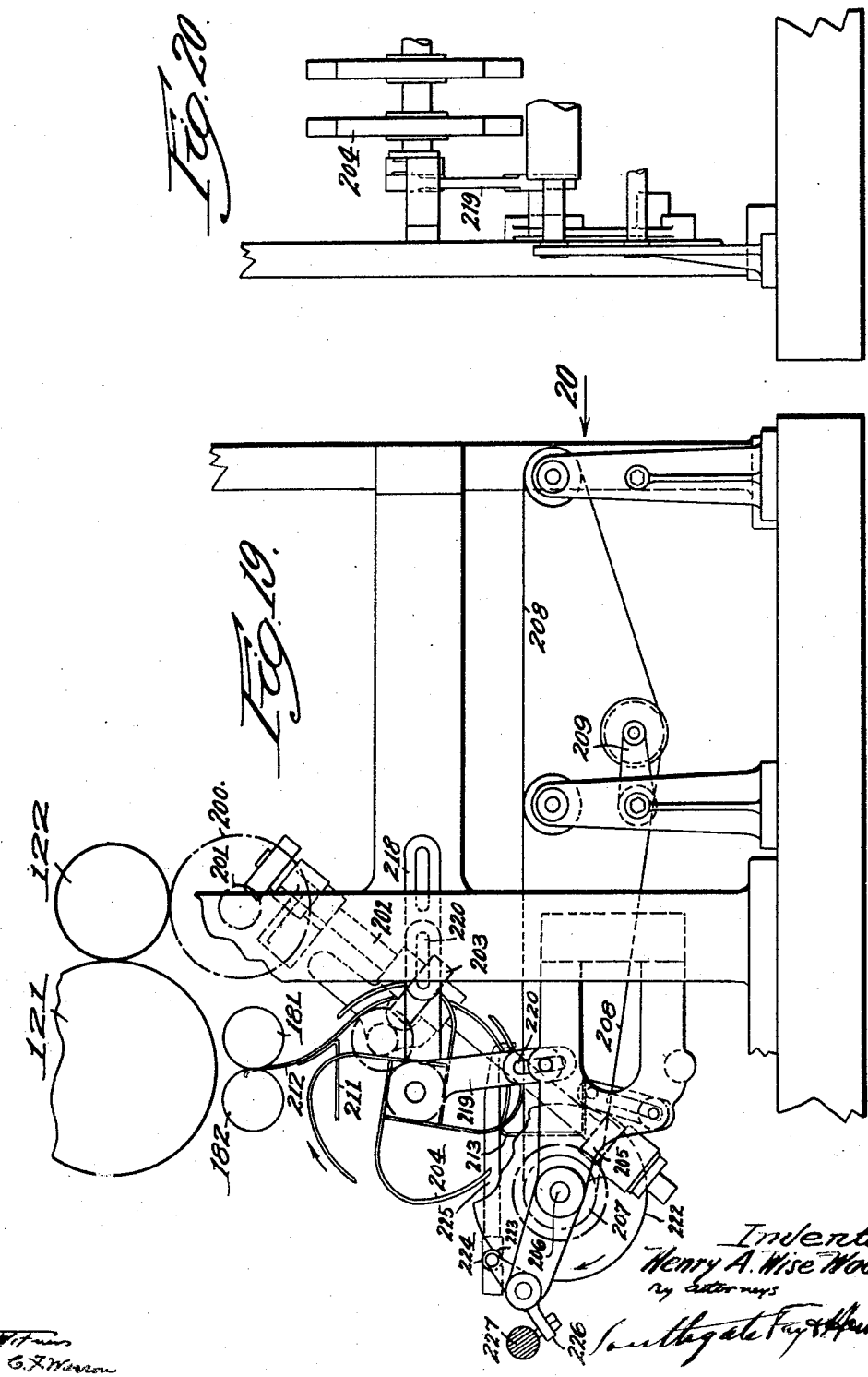

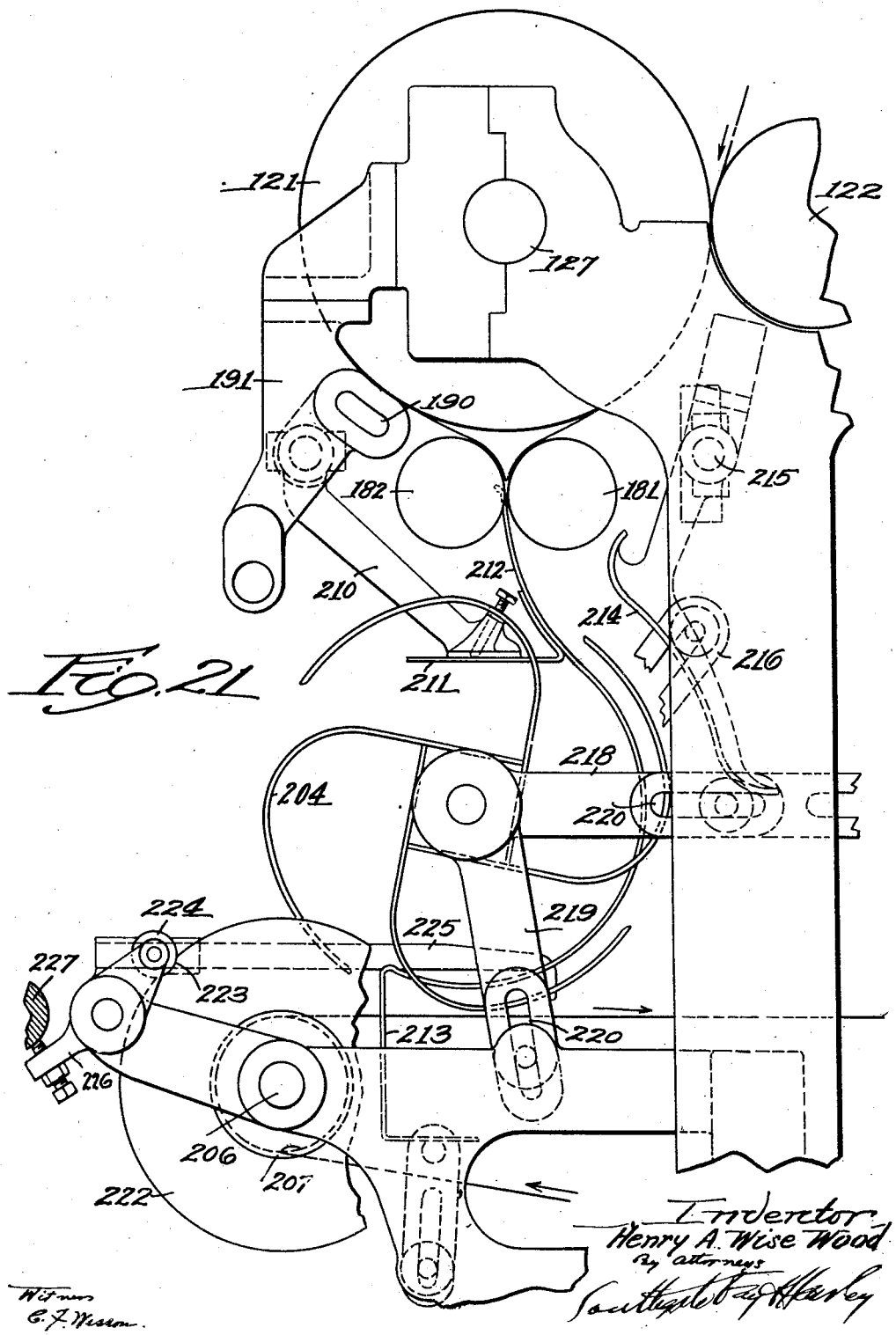

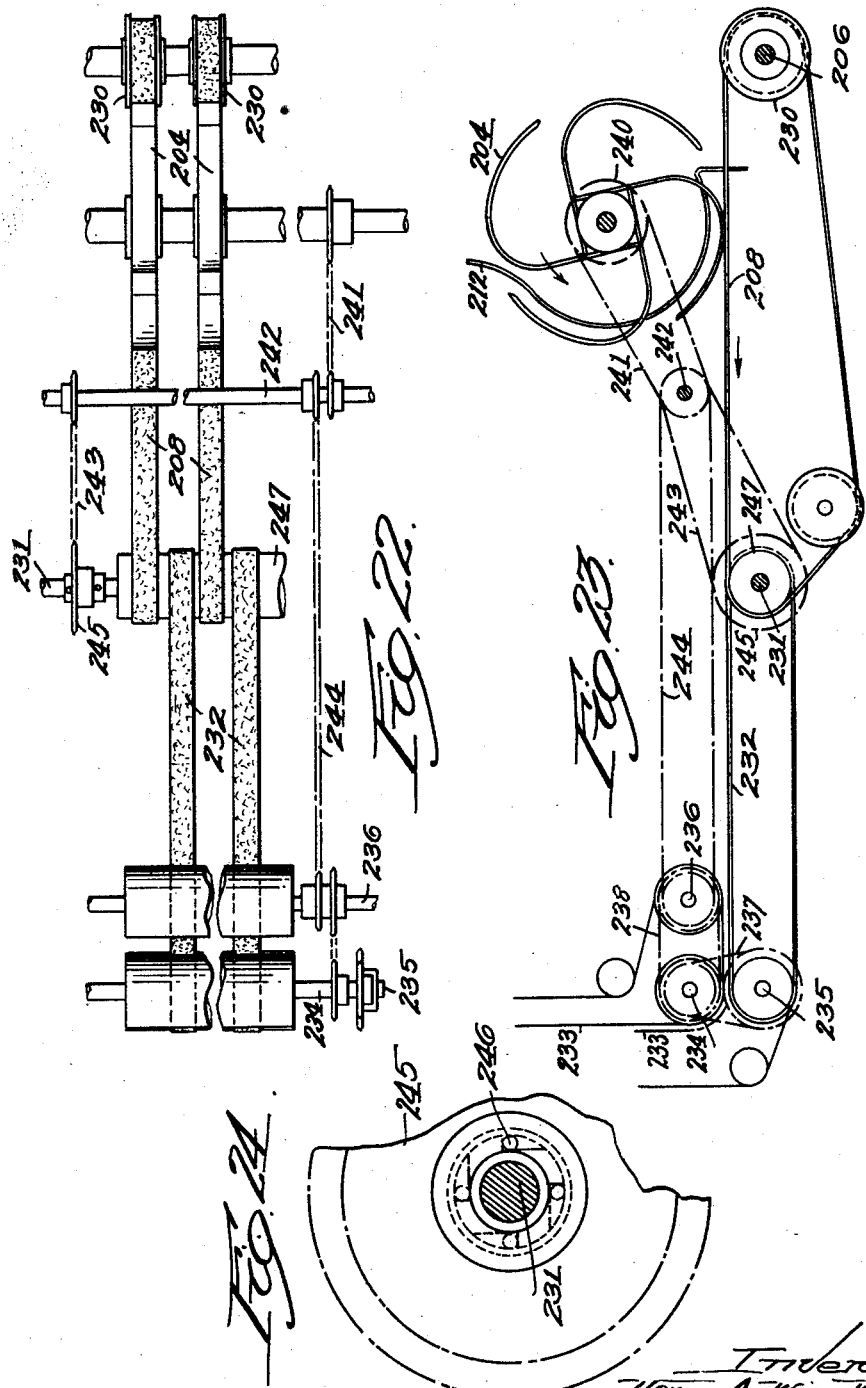

1,883,224

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

FOLDING AND DELIVERY MECHANISM

Original application filed May 26, 1926, Serial No. 111,787. Divided and this application filed April 6, 1929, Serial No. 353,196. Renewed April 7, 1932.

This is a division of my application for Patent Serial No. 111,787, filed May 26, 1926, on a high speed printing press.

The chief objects of this invention are to provide improved means for adjusting the folding rollers and nipping rollers for driving the same and stopping the nipping rollers by hand when necessary; to provide means for protecting the folder elements from breaking in case of any choking; to provide means whereby the folding roller will be released automatically in case of a choke and allow it to move away from the companion roller and from the cylinder, without leaving it under spring pressure; to provide means whereby the web can be transferred from one former to the folding rolls of another folder unit in such a way that a set of nipping rolls will draw it across the press separate from the nipping rolls that draw it over the former and that this action can be provided either to the right or left, thus increasing speed and accuracy; to provide an improved braking arrangement for the folders for stopping the folding cylinder with the press; to provide an improved and simplified means for changing the cutting cylinder from collecting to non-collecting; to provide improved means for silencing a set of pins in the folding cylinder when running collected products; to provide simple means for adjusting the fan-shaft at either end in relation to the other parts of the folder; to provide an auxiliary drive for the delivery roller so that if the conveyor is disabled the movement of the delivery roller will not stop and cause the papers to pile up under the fan and choke up the folders; and in general to provide means whereby all these elements are cooperatively connected and many of them can be thrown out at times to avoid injury to the press or product.

Other objects and advantages of the invention will be described hereinafter.

Reference is to be had to the accompanying drawings in which

Fig. 1 is a partial diagrammatic front view showing a battery of folders connected in accordance with this invention;

Fig. 2 is a side view of the same with the former omitted;

Fig. 2½ is an end view showing the adjusting support for the former;

Fig. 3 is a front view of one folder on enlarged scale illustrating the cooperating parts of the left hand folder in Fig. 1;

Fig. 4 is a sectional view through the center of the driving shaft of the folder as indicated by the arrows 4 in Figs. 3 and 5;

Fig. 5 is a sectional view along the line 5—5 of Fig. 3;

Fig. 6 is a plan of the means for adjusting independently the two ends of the nipping rollers;

Fig. 7 is a section taken on the line 7—7 of Fig. 1 to show the various parts connected therewith and illustrating the bearings for the folding, collecting and cutting cylinders and shafts, also in section;

Fig. 8 is a sectional view through the pin shaft showing its bearing and associated parts;

Fig. 9 is a sectional view of the end of the collecting and cutting cylinder and its bearing, showing the method of changing from a collecting to a non-collecting operation;

Fig. 10 is a detail view of part of the sliding lock thereof;

Fig. 11 is a side view of the knife box;

Fig. 12 is a sectional view of the same;

Fig. 13 is a transverse sectional view of the folding cylinders;

Fig. 14 is an end view of the cam for the folding cylinder;

Fig. 15 is an edge view of a portion of the cam thereof with associated parts;

Fig. 16 is an end view of the folding rollers and associated parts as indicated by the arrow 16 in Fig. 18;

Fig. 17 is a front view thereof as indicated by the arrow 17 in Fig. 18;

Fig. 18 is a plan of the same showing the supporting and bearing devices in section;

Fig. 19 is a side view of the left hand delivery arrangement;

Fig. 20 is a rear view;

Fig. 21 is a view similar to Fig. 19 on a larger scale showing in detail the means for attaching and supporting the paper guides and fan;

Fig. 22 is a plan of the drive for the delivery roller;

Fig. 23 is a side view thereof, and

Fig. 24 is an end view of the sprocket wheel therefor.

The transferring of a web across from the former of one folder to another folder at the side thereof has been apt to cause breaks, chokes and inaccuracy. By this invention these difficulties have been largely avoided and the speed increased. For this purpose I take the web from one former through its nipping rolls and then across through the nipping rolls of the other folder. Thus the web is nipped and positively controlled at two separated points and its action, therefore, is accurate.

When one or both of the folding rolls of a folding machine are spring pressed, the appearance of a choke results in putting the same under increased spring pressure, thereby intensifying the strain, instead of relieving it. By my invention the pressure is entirely relieved by the use of connecting means that gives way entirely under the increased pressure due to choking.

Referring to the first two sheets of drawings, I have shown two units of this folder to be run by the main shaft S. On one of the sections of the main shaft is a bevel gear, driving a vertical shaft 62 on a folder frame 61 resting on the platform 2. This is the driving shaft of one of the folders. Near the top of this shaft are beveled gears 63 driving a train of gears 64 and through that a drag roll 33. I have shown several webs $W^3$ coming into the leading-in rolls 34 to provide for the condition in which a press unit delivers to the folder from the other side.

The usual formers 92 are supported in position to receive the webs from the two drag rolls. I have shown a new means for supporting the formers, which comprises supporting brackets 93 each carrying three loose studs 97. A horizontal 94 extends across between the brackets. On this shaft are two rings 95 having three radial bolts 96 arranged around it at 120 degrees apart. These bolts pass radially through the three studs 97 and are held to the studs by nuts and adjusted as desired to change the position of the shaft 94. The shaft carries two supports 98 on which the former 92 is mounted. The nuts on these bolts can be adjusted as desired. With this adjustment it is possible to move the former into any desired position and clamp it in that position.

The formers are shown as delivering through leading-in or forming rolls 99 to primary nipping rolls 100 and secondary nipping rolls 101. The principal webs pass from the several formers directly through the corresponding sets of nipping rolls. I have shown a web $W^4$ coming into the folder over an adjusting device 91 to the second or supplementary nipping rolls of one set. Another web $W^5$ is shown passing from either set of primary nipping rolls to the other set of secondary nipping rolls. Each pair of nipping rolls is individually adjusted and spring seated as shown. This adjustment comprises a rod 102 having two hand wheels 103 one fixed to it and the other fixed to a sleeve $102^a$ thereon. This rod and sleeve having two worms 104 thereon meshing with wheels 105, each wheel fixed on a screw 106, pivotally supported by a bracket 107 on the frame and pivotally connected at the other end in an arm 108 extending from the shaft of the nipper roll. A spring 109 adjustable by nuts or the like normally holds this nipping roll against the other of the pair, but it is held yieldingly and adjustably. The adjustment can be made the same at both ends as indicated at Fig. 6 by turning both hand wheels 103 but each end can be adjusted separately by its hand wheel.

When it is necessary to transfer a web from the right-hand former it first passes through the upper nipping rollers 100 set beneath the former and then crosses over the press to the left and passes to the folding cylinder there shown through tension rolls 90 and over nipping rollers 101 of the left hand folder. Thus in a transferred web the first set of nipping rollers draws it over the former and the second set draws it across the press and feeds it in register to the folding cylinder. Also, the same thing may be done from the left hand former to the right hand folding cylinder. The same system may be used to bring the web down from the former of the upper part of the press to the folding cylinder of another folder directly beneath the upper folder. This device makes for speed and accuracy and the avoidance of paper breaks and chokes.

Also a web $W^4$ can be brought into the folder from the side over ordinary guide rollers 87 and 88 and an adjustable roll 89 and into the lower nipping rollers 101 without going over the former. This is for a narrow web or insert.

The upper nipping rolls are driven by a shaft 110 receiving its power through bevel gears from the vertical shaft 62. This shaft, by means of bevelled gears shown in Fig. 5, drives the upper nipping roll shaft 111. The bevel gear on this shaft is fixed to it, but the bevel gear 112 on the shaft 110 is slidably keyed thereto. It is provided with ball bearings in brackets 113 on the former carriage which have uniform passages therethrough for the bearings of the shaft 110. In the outer casing 114 of the ball bearing is a slot 115 adapted to be engaged by the end of the screw 116, carried by the bracket 113 to allow for longitudinal adjustment. This casing is provided with an internal screw thread and there is a collar 117 therein with an external screw thread which screws up against the ball bearing. The bracket 113 is provided with a circular groove 118 and a hand wheel 119 has a circular flange entering the groove 118. This hand wheel has a screw thread meshing with the screw on the collar 117. The turning of this hand wheel therefore shifts all the parts connected with the collar 117 including the gear 112. This is provided because the nipping rollers are supported by brackets 113 carried by the carriage of the former. This carriage is adjustable by a hand wheel 120 and screw to move laterally. Therefore this adjustment is provided to keep the two gears in mesh, if desired, when the former carriage is adjusted. It can be used also for disconnecting the nipping rolls temporarily in case of any trouble.

The web, of course, is led from the nipping rolls to the folding cylinder 121 and cutting and collecting cylinder 122 as usual. There is a horizontal shaft 123 connected by gearing to the shaft 62 for driving these cylinders. This shaft 123 is provided indirectly with ratchet teeth 124 cooperating with an opposite circular rack 133 for keeping a gear 125 in mesh with a gear 126 on the shaft 127 of the folding cylinder. This gear 125 is provided with a hub 128 which is slidingly keyed to the shaft 123 and has the ratchet teeth 124 on its end. It is connected to the gear 125 by a shear pin 129 which is designed to shear off in case the web chokes up the folder to such an extent as to stop the machine. This is a protecting device constituting the weakest point in the transmission and the one easiest to fix.

Behind the hub is a box 130 fixed to the shaft and having a spring 131 pressing on a plate 132 fixed to the end of the hub 128. The rack 133 is temporarily held to the shaft 123 by a collar 133ª, spring pin and set screw. When it is desired to disconnect the gear 125 from the gear 126, it is necessary to turn the member 133 until the ratchet teeth are in mesh with each other. Then the spring 131 pushes the hub 128 and gear 125 along until the latter is out of mesh.

The shaft 123 is mounted in ball bearings on the frame of the folder and is provided with a magnetic brake 136 connected electrically with the brakes of the printing cylinders, inking cylinders and other heavy elements.

The shaft 127, through a pair of gears 137, drives the shaft 138 of the cutting and collecting cylinder. I have shown the means employed for changing the cutting cylinder 122 from a collecting cylinder to a non-collecting one. On the frame is mounted a shaft 140 adapted to be turned by a handle 141 to two different positions controlled by depressions and a spring pin 142 and to be fastened in adjusted position by a nut 143. This shaft 140 is provided with an eccentric stud 144 on which are a pair of speed change gears 145 meshing with gears 146 and 147 respectively. The gear 146 is fixed on a shoulder on the pin operating cam 148 while the gear 147 is fixed on the shaft 138.

The cylinder 122 is provided with a sliding lock 149 having a pin for guiding it. A bolt 150 has its head located in a slot 151 in the lock which has a margin around it for receiving the edge of the head of the bolt. When it is desired to run non-collected products the only thing necessary is to throw the half speed gears out of mesh with each other and to push the sliding lock 149 so that its pin will enter a hole 152 in the pin operating cam 148. This makes the cam rotate positively with the cutting and collecting cylinder instead of being rotated at a different speed as it does when running on collected products. The operation of the cam 148 is shown more fully in Fig. 8 where its cam groove 153 operates a crank 154 on the pin operating shaft 155 as usual. The usual pins 156 are shown.

The means for holding the knife box in place and the means for springing the cheek woods on each side of the cutting knife are shown in Figs. 11 and 12. They involve some changes from the construction shown and claimed in my co-pending application Serial No. 666,364. The two part knife box 160 is removably mounted in a recess in the cylinder 122. They, themselves, are recessed to receive the cheek woods 161 with the cutting blade 162 between them. The cheek woods are moved outwardly together from the position shown in Fig. 12 to that shown in Fig. 13 by a series of springs 163 and as usual moved back by contact with the folding cylinder. The blade is adjusted by a series of screws 164 on holders 165 at the ends of the blade.

The folding cylinder has the usual cooperating cutting rubbers 166 and pins 167 (see Fig. 13). One set of pins can be silenced in a very simple manner for the usual purpose. The pin operating cam 168 swings a roll 169 on an arm projecting from the pin rod 170. On the latter are the arms 171 for reciprocating the pins 167. On the end of the pin rod is a loose cam lever 172 and a keyed operating lever 173. Two screws 174 and 175 hold the levers 172 and 173 together by means of a cross bar 176. To silence this series of pins, the screw 175 is taken out, thus allowing the lever 172 to oscillate idly. Then the screw 175 is inserted through a hole in an arm 177 on the operating lever 173 and screwed into a bracket 178 on the folding cylinder. Thus the pin rod 170 is positively prevented from oscillating. A counter 179 is shown on the end of the folding cylinder shaft.

The folding cylinder has the usual folding blades 180 for tucking the folded sheets between the folding rolls 181 and 182. I call the folding roll 181 the stationary one as it is stationary after adjustment along the curved slots 183 in the arms 184 which support its bearings 185. These arms 184 are hung on pivots 186 on the folder frame. The arms are held in place by shearing pins 187 that are constructed to break in case of a choke that would stop the proper feed. This is an important improvement over spring pressed rolls because a choke compresses the springs and puts them under increased pressure, thus intensifying the difficulty of putting the paper through if a big choke occurs.

The other folding roll 182 is carried by arms 188 pivoted on studs 189 adjustably carried in curved slots 190 in brackets 191. It is forced against the companion roll 181 by springs 192, pivotally connected with the arms 188 and adjustable. These springs are carried by pivoted rods 193. Both of them can be adjusted simultaneously, as in the case of the nipping rollers, by two hand wheels 194, rod 195 and worms 196 on the brackets 191. The worms mesh with worm wheels 197 threaded on the rods 193. One worm is pinned to the rod 195 and the other is loose on it but has the second hand wheel fixed to it. By turning both hand wheels both ends of the roll are adjusted but either end can be by turning only one hand wheel. Both rolls can be adjusted if desired to bring the pair into a different position with respect to the folding cylinder. These rolls are supported in ball bearings and geared together and to the folding cylinder. Some of these features constitute improvements over my co-pending application, Serial No. 580,437.

*The delivery*

The cutting and collecting cylinder has a gear on its shaft which drives a gear 200 on a shaft on which there is a spiral gear 201. This gear drives a spiral gear on a shaft 202 for operating the delivery. Two complete folders being shown, two of these shafts 202 are necessary. I have not shown them exactly in the same position because two forms of delivery tapes are shown and the fans are placed differently. But they are exactly alike except for their angular position and distances between the spiral gears thereon. Each of these shafts is provided with a spiral gear 203 which drives the train of gearing that directly operates the delivery fan 204. Also on each shaft 202 is a spiral gear 205 which directly meshes with a gear on the shaft 206 of the delivery mechanism.

In the delivery at the right there are pulleys 207 on the shaft 206 which drive delivery tapes 208 which are supported in the usual manner and receive the products from the fan and deliver to the right. A tightening means 209 is shown for these delivery tapes. This is the simpler arrangement.

Before describing the other form of delivery, I will describe certain details relating to the fan. There is an arm 210 extending from the bracket 191 which has a plate 211 at the bottom turned up at the ends to furnish a support for a paper guide 212. This guide extends from the folding rollers on a curvature down around through the fan. At the bottom it is fastened to an adjustable bracket 213 on the frame of the folder. This guide is provided with an S curve and the lower part of it is concentric with the center of the fan and at a short distance inside the curved blades. This, it will be obvious, controls the position of the paper. There is also shown a back guide 214 for the paper which is pivoted on studs 215 and adjusted by means of slotted brackets 216 on the frame. This intercepts any paper that goes wrong far enough to get outside the fan.

The fan itself is supported by two sets of arms or brackets 218 and 219, each having a slot 220 by which it can be fastened in adjusted position on the frame by usual bolts. This provides for setting the fan in any desired position, either laterally or vertically.

On the shaft 206 there is the usual counting mechanism comprising a disc 222 having a notch 223 for operating a roll 224 and allowing the roll to move into the notch once in each rotation of the disc. This counting mechanism is not a part of this invention, but it operates hooks 225 to separate one sheet after fifty papers have run so it will be easy to pick out the product in bunches of fifty. This device operates once for every twenty five products if they are collected products. It is adjusted by an arm 226 having a screw resting against a stop 227.

I have described an additional feature for the delivery tapes as shown on the left side. In this case the tapes 208 are run from a second shaft 206 as shown on the right side of Fig. 1 and in substantially the same manner. The shaft 206 is the shaft that supports the counter above described. It is provided with pulleys 230 which are loose thereon and have no function except to support the tapes. On another shaft 231, extending transversely, there are pulleys fixed thereto for supporting the tapes 208. There are other pulleys fixed thereto for driving, when necessary, tapes 232. These tapes 232 constitute a continuation of the delivery. They deliver directly to a pair of tapes 233 which are driven by means not shown herein and provide a place between them for receiving the printed products from the tapes 232 at the left and carrying them off to any desired point.

These tapes 233 pass over pulleys on shafts 234, 235 and 236. These shafts are connected together by belts or chains 237 and 238 and one of them can be driven by a separate motor or in any other desired way. A separate motor ordinarily is used, simply to drive these shafts after the machine stops to deliver the products already collected. It will be observed that on the fan shaft there is a pulley 240 which drives a chain 241 by a sprocket on a shaft 242. On this shaft there is another sprocket which drives a chain 243 which in turn drives the shaft 231. This is the usual way of operating and providing the power. The shaft 236 is also connected with the shaft 242 by another chain 244 and sprocket wheels.

In the ordinary operation the delivery tapes 208 and 232 are driven by the chains 241 and 244 and the shafts 234, 235 and 236 are also driven by this power. The chain 243 drives a ratchet equipped sprocket wheel 245. This is shown as having a well known form of ratchet 246. The speed ratio is arranged so that ordinarily this chain 243 drives the ratchet wheel 245 at a slower speed than the roll 247 on the shaft 231 on which the wheel 245 is located. Therefore this does no work normally but merely ratchets over the ratchet teeth all the time.

Now, if a choke occurs in the paper sufficient to break the chain 244, which has been driving all the parts of the delivery, the shaft 242 will have to drive the shaft 231 through the chain 243 and ratchet 245. This drive will be at a lower rate of speed than normally but it will be sufficient to take the papers or products out of the delivery and clear them from the machine. It is to be understood that while this construction is shown on only one side of the machine, I have done that merely to show two forms in one figure. Preferably I use it on all the folders and on both sides of each of them.

The web is fed in any one of a number of different ways to the formers over the drag roll 33. The former is mounted in a novel manner and adjusted conveniently. The webs can be brought down into the folding machine through the formers or outside them as may be desired. The nipping rolls are arranged in two pairs 100 and 101 and adjusted across the machine so that the two ends of a roll can be adjusted equally and provided with means whereby they can be adjusted independently. The former is movably mounted and means is provided for keeping the nipping rolls in gear independently of the adjustment of the former.

The web then is to be taken to the folding couple which is provided with certain improvements in the method of holding the blade and cheek woods and means for conveniently converting the cutting and collecting cylinder from collecting to non-collecting and vice versa. The folding cylinder is also provided with similar means for silencing a set of pins for this particular purpose. It is mounted and connected so that it can be thrown out of gear very easily without affecting the operation of the rest of the machine. The cylinder also is provided with a magnetic brake cooperating to prevent the stripping of gears and the breaking of the web when the press is stopped.

The folding rolls are mounted conveniently in ball bearings and provided with means by which they are both adjusted circumferentially with respect to the folding cylinder. One is made stationary after adjustment and the other is yieldingly pressed against it. They are capable of being adjusted both ends alike or independently like the nipping rolls.

The delivery comprises several improvements in the method of mounting the fan and the paper guides, but the folded products are delivered substantially in the usual way. However, I have provided an improved auxiliary delivering arrangement by which, in case of breakage of the chain that runs the tapes in normal operation of the delivery, the tapes will continue to operate in the same direction. But they run at lower speed so as to clear the delivery of all products that have been deposited on it before the break occurs.

Although I have illustrated and described only a single form of the invention I am aware of the fact that modifications can be made therein by any person skilled in the art without departing from the scope of the invention as expressed in the claims. Therefore I do not wish to be limited in this respect but what I claim is:—

1. In a folder, the combination with a drag roll for introducing one or more webs into the folder, of a former located in a position for receiving the webs from the drag roll, means for supporting the former comprising a pair of brackets, a shaft extending across under the former, between but not in contact with, the brackets, a support at each end of the shaft, means carried by said supports for supporting the former, and means for adjusting the position of the shaft and the former.

2. In a folder, the combination with a drag roll for introducing one or more webs into the folder, of a former located in a position for receiving the webs from the drag roll, means for supporting the former comprising a pair of brackets, a shaft extending across the former between the brackets, a support at each end of the shaft having radial bolts extending therefrom equally spaced around the shaft, means carried by said supports for supporting the former, and means for adjusting said bolts universally in a plane to adjust the position of the shaft and the former.

3. In a folder, the combination of a former, means for supporting the former comprising a pair of brackets, a shaft extending across the former between the brackets, a support at each end of the shaft having radial bolts extending therefrom equally spaced around the shaft, and means carried by said supports for supporting the former, said bolts being adjustable radially to clamp the position of the shaft and the former.

4. The combination with a former, of a pair of brackets, a plurality of pins mounted thereon, a screw passing through each pin, a shaft carried by said screws, and supports on which the former is mounted carried by said shaft, whereby the former can be adjusted.

5. The combination with a former for a folding machine, of an adjustable supporting means for the former, comprising a pair of brackets, means on each bracket for adjustably carrying three radial screws arranged at 120° apart, two collars, each supported by a set of three screws, a shaft carried by said collars and supports for the formers fixed to said shaft.

6. In a folder the combination with a folding couple, of a nipping roll on the intake side thereof, a screw adjustment for each end thereof, a worm device for turning each screw, a shaft to which one worm is fixed, a sleeve on the shaft to which the other worm is fixed, and two hand wheels, on the shaft and sleeve and located adjacent each other so that they can both be turned to adjust the roll as a whole.

7. In a folder, the combination with an adjustable former and folding mechanism, of a pair of nipping rolls between the former and the folding couple, an operating shaft for the nipping rolls having a gear slidably mounted thereon, a gear on one of the nipping rolls normally meshing with the first named gear, and means for moving the slidable gear along its shaft to keep it in mesh with the second gear when the former is adjusted.

8. In a folder for a printing machine, the combination with an adjustable former, a support for the former and brackets mounted on said support, of a pair of nipping rolls mounted on the frame of the folder, a driving shaft supported by said brackets, a gear slidably keyed on the driving shaft, a gear on one of the nipping rolls meshing with the first-named gear and means whereby, when the relation between the former and folding machine is changed, the slidable gear can be moved along the shaft to stay in mesh with the second gear.

9. In a folding machine, the combination with a pair of nipping rolls and a gear for driving them, of a driving shaft, a gear slidably keyed on the driving shaft and meshing with the first-named gear, a frame having a passage therethrough, a bearing for said shaft slidably mounted to move in said passage, and means for moving the slidable gear on its shaft to turn the nipping rolls in all positions of their support.

10. In a folding machine, the combination with a pair of nipping rolls and a gear for driving them, of a driving shaft, a gear slidably keyed on the driving shaft and meshing with the first-named gear, a frame having a passage therethrough, a bearing for said shaft slidably mounted to move in said passage, a screw-threaded collar connected with the bearing and a hand wheel having a screw thread meshing with the screw thread on the collar and having means for preventing its longitudinal movement in said passage, whereby the turning of the hand wheel will move the gear on the driving shaft.

11. In a folder, the combination with a folding couple, of a pair of nipping rolls on the intake side thereof, and means for adjusting each end of one roll independently toward or from the other roll, said means comprising two hand wheels on the same axis and close together, so that they can both be turned at once to adjust both ends alike.

12. In a folding machine, the combination with a folding machine driving shaft, a shaft for driving the folding couple, and means for driving the second shaft, from the first shaft, of a gear slidably keyed to the second shaft, a gear on one member of the folding couple meshing with the first named gear, yielding means for normally pushing the first named gear along its shaft out of mesh, and a ratchet device rotatably mounted on the second shaft for operating against the yielding means when turned to the right position and positively forcing the gear into mesh.

13. In a folding machine, the combination with a shaft for driving the folding couple, of a hub slidably keyed to the shaft, a gear on the hub connected to it by a sheer pin, a gear on one member of the folding couple meshing with the first-named gear, a spring for normally pushing the hub along its shaft to bring the gear out of mesh, and a ratchet device mounted on said shaft for operating against the spring and forcing the gear into mesh.

14. In a folding machine, the combination with a shaft for driving the folding couple, of a gear slidably keyed to the shaft, a gear on one member of the folding couple meshing with the first named gear, yielding means for normally pushing the first named gear along its shaft out of mesh, and a ratchet device rotatably mounted on the shaft for operating against the yielding means and forcing the gear into mesh.

15. In a device for disconnecting a folding couple from a driving shaft, the combination with a driving shaft for the couple, and a pair of bevel gears, one connected with the folding couple and the other slidably keyed to the driving shaft, of a double ratchet device for normally pushing the slidable gear into mesh with its companion gear, comprising a collar adapted to be secured to the driving shaft but not transmitting power to it, whereby when said collar is released and turned, the ratchet device can contract, and yielding means for pushing the gear back when the ratchet device is in a position to permit it, to disconnect the folding couple.

16. In a folding couple, the combination with the folding and cutting cylinders, of a plurality of pins on the folding cylinder, a cam lever and operating lever for each set of pins, a screw for connecting said levers together, and means whereby when the screw is taken out that set of pins will be silenced.

17. In a folding couple, the combination with the folding and cutting cylinders, of a plurality of pin rods on the folding cylinder, a loose cam lever and a keyed operating lever on each pin rod, and a screw for connecting the two levers together in each case so that the pins will be operated, whereby when the screw is taken out and put through the operating lever to secure it in fixed position to the cylinder the pins will be silenced.

18. In a folding couple, the combination with the folding and cutting cylinders, of a plurality of pin rods on the folding cylinder, a loose cam lever and a keyed operating lever on each pin rod, a screw for connecting the two levers together in each case so that the pins will be operated, and means for securing the operating lever to the cylinder in fixed position to silence that set of pins.

19. In a folding couple, the combination with a folding cylinder and a cutting and collecting cylinder, of a pin operating cam, reducing speed gearing for driving the cam, means for throwing out said gearing, and a lock on the cutting and collecting cylinder having a pin projecting therefrom into said cam to hold the cam against rotation and prevent the operation of the pins.

20. In a folding couple, the combination with a folding cylinder and a pin operating cam connected therewith, of means for throwing out said cam, a sliding lock on the cutting and collecting cylinder having a pin projecting therefrom into said cam to hold the cam against rotation, said lock having a slot with a ledge therearound, and a headed screw adapted to hold the lock in either of its extreme positions, whereby the cutting cylinder can be run either for collecting or non-collecting.

21. In a sheet delivery, the combination with the cutting and collecting cylinder and gearing connected therewith, of a shaft driven by said gearing, a fan, means connected with said shaft for driving the fan, a series of delivery tapes, a counting device and means operated by said shaft for driving the counting device.

22. In a sheet delivery, the combination with the cutting and collecting cylinder and gearing connected therewith, of a shaft driven by said gearing, a fan, means connected with said shaft for driving the fan, a series of delivery tapes, means operated independently for driving the delivery tapes, and means operated by the fan shaft for driving said tapes.

23. In a delivery for a folder, the combination with the cutting and collecting cylinder and gearing connected therewith, a shaft driven by said gearing, a fan, and means connected with said shaft for driving the fan, of a series of delivery tapes, an intermediate shaft, means on the fan shaft for driving said intermediate shaft, a roll for receiving the tapes, means operated by said intermediate shaft for driving the roll when necessary, comprising a sprocket wheel having a ratchet and geared up to rotate at a lower speed than the roll, and independent means for driving said roll at a higher speed, whereby the ratchet sprocket wheel will operate idly unless the power is disconnected at some point, in which case it will drive the delivery tapes at slower than normal speed for clearing the folder.

In testimony whereof I have hereunto affixed my signature.

HENRY A. WISE WOOD.